United States Patent
Ho et al.

(10) Patent No.: US 6,498,921 B1
(45) Date of Patent: Dec. 24, 2002

(54) METHOD AND SYSTEM TO ANSWER A NATURAL-LANGUAGE QUESTION

(76) Inventors: Chi Fai Ho, 965 Astoria Dr., Sunnyvale, CA (US) 94087; Peter P. Tong, 1807 Limetree La., Mountain View, CA (US) 94040

( * ) Notice: Subject to any disclaimer, the term of this patent is extended or adjusted under 35 U.S.C. 154(b) by 0 days.

(21) Appl. No.: 09/387,932

(22) Filed: Sep. 1, 1999

(51) Int. Cl.⁷ .................................................. G09B 7/00
(52) U.S. Cl. ...................... 434/362; 434/118; 434/169; 434/325; 704/257; 706/927
(58) Field of Search .................................. 434/118, 156, 434/169, 185, 219, 307 R, 308, 322, 323, 327, 325, 350, 362, 365; 704/1, 207, 257, 258, 273, 276, 260; 706/927, 11, 55, 59, 916; 707/5, 35; 709/201, 212, 227, 229, 242, 244; 382/161, 229, 311; 340/7.23, 7.29, 825.27; 345/326, 538

(56) References Cited

U.S. PATENT DOCUMENTS

| | | | |
|---|---|---|---|
| 4,787,035 A | | 11/1988 | Bourne |
| 4,798,543 A | | 1/1989 | Spiece |
| 4,816,994 A | * | 3/1989 | Freiling et al. ............... 706/59 |
| 4,847,784 A | | 7/1989 | Clancey |
| 4,867,685 A | | 9/1989 | Brush et al. |
| 4,914,590 A | | 4/1990 | Loatman et al. |
| 5,035,625 A | | 7/1991 | Monson et al. |
| 5,239,617 A | | 8/1993 | Gardner et al. |
| 5,259,766 A | | 11/1993 | Sack et al. |
| 5,265,014 A | | 11/1993 | Haddock et al. |
| 5,265,065 A | | 11/1993 | Turtle |
| 5,286,036 A | | 2/1994 | Barabash |
| 5,295,836 A | | 3/1994 | Ryu et al. |
| 5,301,314 A | | 4/1994 | Gifford et al. |
| 5,306,154 A | | 4/1994 | Ujita et al. |
| 5,309,359 A | | 5/1994 | Katz et al. |

(List continued on next page.)

FOREIGN PATENT DOCUMENTS

| | | |
|---|---|---|
| EP | 0 436 459 A | 7/1991 |
| WO | WO 93/21587 | 10/1993 |
| WO | WO 95/02221 | 1/1995 |

OTHER PUBLICATIONS

Success Maker Courseware brochure, published by Computer Curriculum Corporation, Dec. 1994.
Active Mind Series from World Wide Web, URL=http://www.broderbund.com/studio/ams.html, 1996.
Logical Journal of the Zoombinis from World Wide Web, URL=http://www.broderbund.com/studio/atoz/zoombini.html, 1996.

(List continued on next page.)

*Primary Examiner*—Joe H. Cheng
(74) *Attorney, Agent, or Firm*—Beyer Weaver & Thomas, LLP

(57) ABSTRACT

Providing methods and systems to quickly and accurately respond to a natural-language question. The responses to the question can depend on additional information about the user asking the question, and the subject matter of the question the user asked. For example, the system knows that the user understands French, and can supply French answers to the user. Such additional information can improve on relevancy of the responses to the question. More than one responses can be provided to the user to allow the user to pick the more appropriate one. One embodiment uses a computer with a database having many phrases and question formats. The computer identifies phrases in the question based on at least one grammatical rules and phrases in the database. Then the computer links the phrases to categories based on at least one semantic rule, the subject matter of the question, and information about the user, such as previous questions asked by the user. The computer then selects at least two question formats based on at least the scores. After the question formats are selected, the system allows the user to pick at least one of the question formats so as to have an answer to the question generated.

34 Claims, 11 Drawing Sheets

U.S. PATENT DOCUMENTS

| | | | |
|---|---|---|---|
| 5,384,894 A | | 1/1995 | Vassiliadis et al. |
| 5,386,556 A | | 1/1995 | Hedin et al. |
| 5,404,295 A | | 4/1995 | Katz et al. |
| 5,414,797 A | | 5/1995 | Vassiliadis et al. |
| 5,418,717 A | | 5/1995 | Su et al. |
| 5,423,032 A | | 6/1995 | Byrd et al. |
| 5,441,415 A | | 8/1995 | Lee et al. |
| 5,446,883 A | | 8/1995 | Kirkbride et al. |
| 5,454,106 A | | 9/1995 | Burns et al. |
| 5,495,604 A | | 2/1996 | Harding et al. |
| 5,519,608 A | | 5/1996 | Kupiec |
| 5,581,664 A | | 12/1996 | Allen et al. |
| 5,586,218 A | | 12/1996 | Allen |
| 5,597,312 A | | 1/1997 | Bloom et al. |
| 5,634,121 A | | 5/1997 | Tracz et al. |
| 5,652,828 A | | 7/1997 | Silverman |
| 5,677,835 A | | 10/1997 | Carbonell et al. |
| 5,677,993 A | * | 10/1997 | Ohga et al. ................. 704/257 |
| 5,696,980 A | * | 12/1997 | Brew ......................... 704/273 |
| 5,701,399 A | | 12/1997 | Lee et al. |
| 5,732,395 A | | 3/1998 | Silverman |
| 5,749,071 A | | 5/1998 | Silverman |
| 5,751,906 A | | 5/1998 | Silverman |
| 5,754,938 A | | 5/1998 | Herz et al. |
| 5,754,939 A | | 5/1998 | Herz et al. |
| 5,787,234 A | | 7/1998 | Molloy |
| 5,794,050 A | | 8/1998 | Dahlgren et al. |
| 5,797,135 A | | 8/1998 | Whalen et al. |
| 5,819,258 A | | 10/1998 | Vaithyanathan et al. |
| 5,819,260 A | | 10/1998 | Lu et al. |
| 5,835,087 A | | 11/1998 | Herz et al. |
| 5,836,771 A | | 11/1998 | Ho et al. |
| 5,852,814 A | | 12/1998 | Allen |
| 5,884,302 A | | 3/1999 | Ho |
| 5,909,679 A | | 6/1999 | Hall |
| 5,933,531 A | | 8/1999 | Lorie |
| 5,933,816 A | | 8/1999 | Zeanah et al. |
| 5,933,822 A | | 8/1999 | Braden-Harden et al. |
| 5,934,910 A | | 8/1999 | Ho et al. |
| 5,959,543 A | | 9/1999 | LaPorta et al. |
| 5,963,948 A | | 10/1999 | Shilcrat |
| 5,963,965 A | | 10/1999 | Vogel |
| 5,999,908 A | | 12/1999 | Abelow |
| 6,076,088 A | | 6/2000 | Paik et al. |
| 6,078,914 A | | 6/2000 | Redfern |
| 6,088,717 A | | 7/2000 | Reed et al. |
| 6,101,515 A | | 8/2000 | Wical et al. |
| 6,160,987 A | * | 12/2000 | No et al. ..................... 434/350 |
| 6,263,335 B1 | * | 7/2001 | Paik et al. ...................... 707/5 |
| 6,266,664 B1 | | 7/2001 | Russell-Falla et al. |
| 6,269,329 B1 | * | 7/2001 | Nordstrom ..................... 704/1 |
| 6,336,029 B1 | | 1/2002 | Ho et al. |
| 6,349,307 B1 | | 2/2002 | Chen |
| 6,393,428 B1 | | 5/2002 | Miller et al. |

OTHER PUBLICATIONS

Selecting Software by PC Novice Series, vol. 3, Issue 12, pp. 51, 64, and 89–92, 1995.

Computerized Adaptive Testing, Oct. 24, 1994, from World Wide Web, URL=Gopher://Gopher.ETS.org.

Innovation and Technologies, Oct. 21, 1994, from World Wide Web, URL=Gopher://Gopher.ETS.org.

Interactive Mathematic Instructor's Guide by Academic Systems, pp. 86 and 114, Aug. 1995.

High School Learning and Resource Library by ProOne, photocopy of the box and screen–dump to get 5 pages, 1995.

Web pages from Ask Jeeves Inc. URL=http://www.ask.com, After 1996.

"Natural Language Interfaces to Databases—An Introduction" by Androutsopoulos et al, Mar. 1995, pp. 1–49.

Woods, W.A., "Semantics And Quantification In Natural Language Question Answering," Academic Press, pp. 205–248, 1978.

Whalen, Thomas, "*Computational Behaviourism Applied to Natural Language,*" Communications Research Centre, Ottawa, ON, Apr. 1996.

Bunt, Harry C., "*Dialog Control Functions and Interaction Design,*" Institute for Language Technology and Artificial Intelligence ITK, The Netherlands, pp. 197–214, 1995.

Whalen, Thomas, "CHAT Conversational Hypertext Access Technology," webpage: http://debra.dgbt.doc.ca/chat/info.page.html, Apr. 1993.

"The CHAT Natural Language System," webpage: http://debra.dgbt.doc.ca/chat/chat.html, 1999.

Prince, Violaine M., "*Relying on a Sophisticated Student Model to Derive Dialog Strategies in an Intelligent Tutoring System,*" pp. 179–194, 1995.

Kaplan, S. Jerrold, "Cooperative Responses From a Portable Natural Language Database Query System," Computational Models of Disclosure, MIT Press, Chapter 3, pp. 167–201, 1983.

Hendrix et al., "*Developing a Natural Language Interface to Complex Data,*" Association for Computing Machinery (ACM), 1978.

Burton et al., "Toward a Natural–Language Capability for Computer–Assisted Instruction," Natural Language Processing, Kaufmann Publishers, pp. 605–624, 1986.

Norvig, Peter, "Paradigms Of Artificial Intelligence Programming: Case Studies In Common LISP", "Student: Solving Algebra Word Problems," Chapter 7, Morgan Kaufmann Publishers, 1992, pp. 219–235.

Response Generation, "Question–Answering Systems," Chapter 16, and "Natural Language Generation," Chapter 17, pp. 468–513.

Burke et al., "*Knowledge–based Information Retrieval from Semi–Structured Text,*" The Artificial Intelligence Laboratory, The University of Chicago, Nov. 1995.

Harris, "Primus releases SolutionBuilder," Service News, Dec., 1995.

Product information re: SolutionBuilder from Primus Communications, Help Desk Buyer's Guide, Call Center Magazine, p. 40, May 1996.

SolutionBuilder User Guide and Command Reference, Version 1.1, Primus Communications Corporation, 1995.

Lim, "Budding Businessses to Watch in '96," The Seattle Times, Jan. 28, 1996.

Baker, "Snafu–solving software at Primus attracts capital," Puget Sound Business Journal, Apr. 29–25, 1996.

* cited by examiner

~ 126

Link Phrases to Categories ~ 302

↓

Provide Scores to ~ 304
Categorized Phrase

↓

Generate Question Structures ~ 306

↓

Provide Scores to ~ 308
Question Structures

↓

Select Question Structures ~ 310

Identify Question Formats for Question Structures ~402

Select Question Formats ~404

Set Default Values in Question Formats ~406

~ 132

Retrieve Answer Formats ~ 452

↓

Access Answers ~ 454

METHOD AND SYSTEM TO ANSWER A NATURAL-LANGUAGE QUESTION

CROSS REFERENCE TO RELATED APPLICATION

The present invention is a continuation-in-part of co-pending U.S. application entitled, "Learning Method and System Based on Questioning III", filed on Jul. 2, 1999, invented by Chi Fai Ho and Peter Tong, and having a Ser. No. of 09/347,184, which is hereby incorporated by reference into this application.

BACKGROUND OF THE INVENTION

The present invention relates generally to methods and systems to answer a question, and more particularly to methods and systems to accurately answer a natural-language question.

Numerous search engines in the market have provided us with an unprecedented amount of freely-available information. All we have to do is to type in our questions, and we will be inundated by information. For example, there is a search engine that regularly gives us tens of thousands of Web sites to a single question. It would take practically days to go through every single site to find our answer, especially if our network connections are through relatively low-speed modems. We do not want thousands of answers to our questions. All we want is a handful of meaningful ones.

Another challenge faced by users of many search engines is to search by key words. We have to extract key words from our questions, and then use them to ask our questions. We might also use enhanced features provided by search engines, such as + or − delimiters before the key words, to indicate our preferences. Unfortunately, this is unnatural. How often do we ask questions using key words? The better way is to ask with a natural language.

There are natural-language search engines. Some of them also provide limited number of responses. However, their responses are inaccurate, and typically do not provide satisfactory answers to our questions. Their answers are not tailored to our needs.

Providing accurate responses to natural language questions is a very difficult problem, especially when our questions are not definite. For example, if you ask the question, "Do you like Turkey?", it is not clear if your question is about the country Turkey or the animal Turkey. Add to this challenge is the need to get answers quickly. Time is very valuable and we prefer not to wait for a long time to get our answers.

To further complicate the problem is the need to get information from documents written in different languages. For example, if we want to learn about climbing Mount Fuji in Japan, probably most of the information is in Japanese. Many search engines in the United States only search for information in English, and ignore information in all other languages. The reason may be because translation errors would lead to even less accurate answers.

It should be apparent from the foregoing that there is still a need for a natural-language question-answering system that can accurately and quickly answer our questions, without providing us with thousands of irrelevant choices. Furthermore, it is desirable for the system to provide us with information from different languages.

SUMMARY OF THE INVENTION

The present invention provides methods and systems that can quickly provide a handful of accurate responses to a natural-language question. The responses can depend on additional information about the user and about the subject matter of the question so as to significantly improve on the relevancy of the responses. The user is allowed to pick one or more of the responses to have an answer generated. Furthermore, the answer to the question can be in a language different from the language of the question to provide more relevant answers.

One embodiment of the present invention includes a system with an input device, an answer generator and an output device. The answer generator, having access to a database of phrases and question formats, identifies at least one phrase in the question to generate phrased questions. This identification process uses phrases in the database and at least one grammatical rule.

The identified phrase can then be linked to at least one category based on, for example, one semantic rule. Then the system provides a score to the categorized phrase. This score can depend on a piece of information about the user and/or about the subject matter of the question. In one embodiment, this piece of information is different from the fact that the user has asked the question.

The piece of information can be related to the user's response to an inquiry from the system. For example, the system can ask the user to specify the subject matter of the question. Assume that the user asks the following question: "In the eighteenth century, what did Indians typically eat?" The system can ask the user if the subject matter of the question is related to India or the aboriginal peoples of North America. Based on the user's response, the system can provide a more relevant response to the user.

In another example, the piece of information is related to an interest of the user. Again, if the user is interested in traveling, and not food, certain ambiguities in his question can be resolved. Based on the user's response to certain inquiries from the system, the accuracy of the answer can be enhanced.

In another embodiment, the piece of information about the user is related to a question previously asked by the user. For example, if the user has been asking questions on sports, probably the word, ball, in his question is not related to ball bearings, which are mechanical parts.

Typically, the more information the system has on the user and the subject matter of the question, the more accurate is the answer to the user's question. The reason is similar to the situation of our responding to our friend's question before he even asks it. Sometimes we understand what they want to know through non-verbal communication or our previous interactions.

Based on information on the user, the score of the categorized phrase can change. In another embodiment, based on information of the subject matter the question is in, the score of the categorized phrase can change.

After providing the score to the categorized phrase, the system can identify at least two question formats in the database based on the score. These question formats can again help the system resolve ambiguities in the question. For example, the question is, "How to play bridge?" Assume that the question is in the general subject area of card games. It is not clear if the user wants to find out basic rules on the card game bridge or to learn some more advanced techniques. Then, one question format can be on basic rules on bridge, and the other format can be on bridge techniques. The user is allowed to pick at least one of the question formats to have the corresponding answer generated.

In another embodiment, the answer can be in a language different from the language of the question. This improves on the accuracy of the answers to the question. For example, if the user is interested in Japan, and if the user understands Japanese, based on the question format picked, a Japanese answer is identified to his English question. Such answers can provide more relevant information to the user.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 7 shows one set of steps related to identifying question structures in the invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
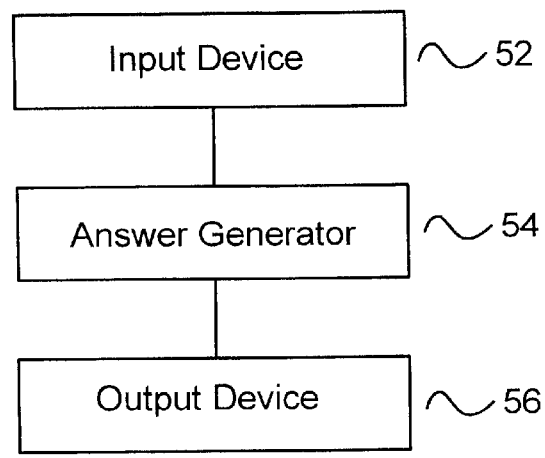
FIG. 1 shows one embodiment of the invention.
Figure 2:
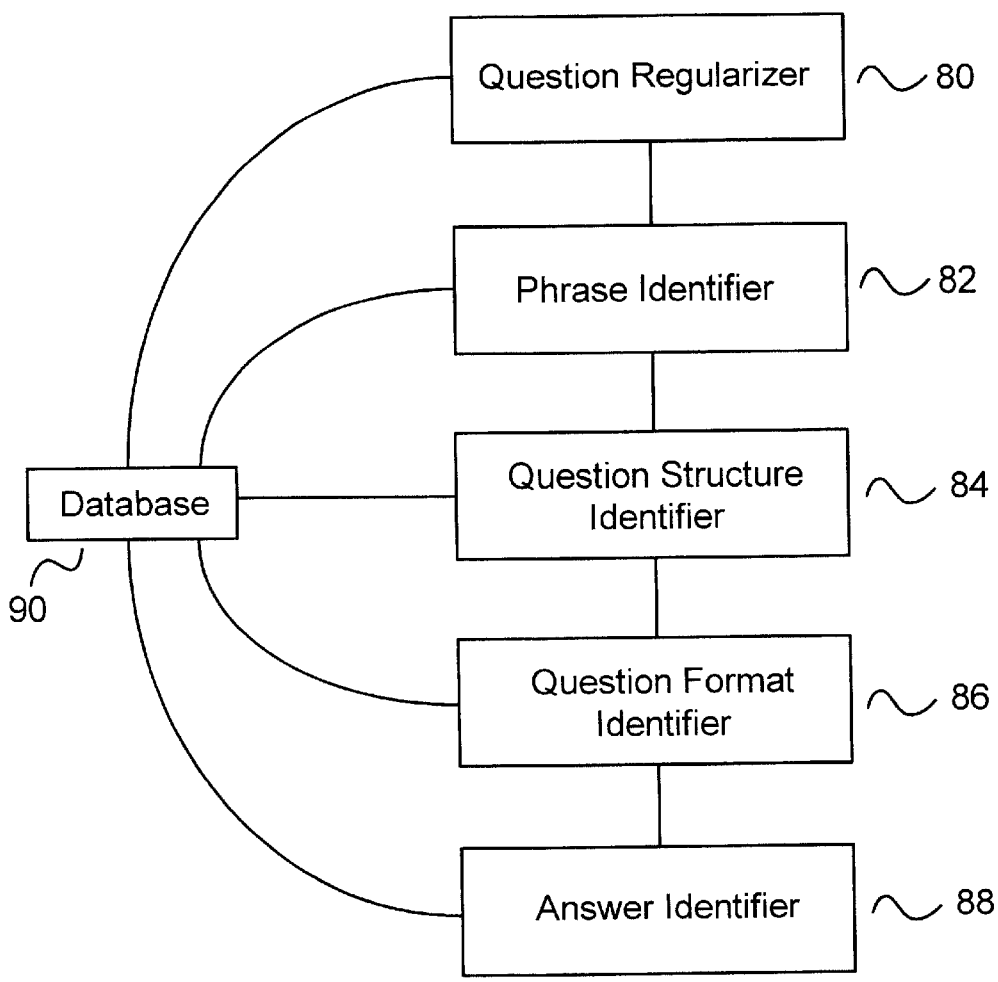
FIG. 2 shows one embodiment of an answer generator of the invention.
Figure 3:
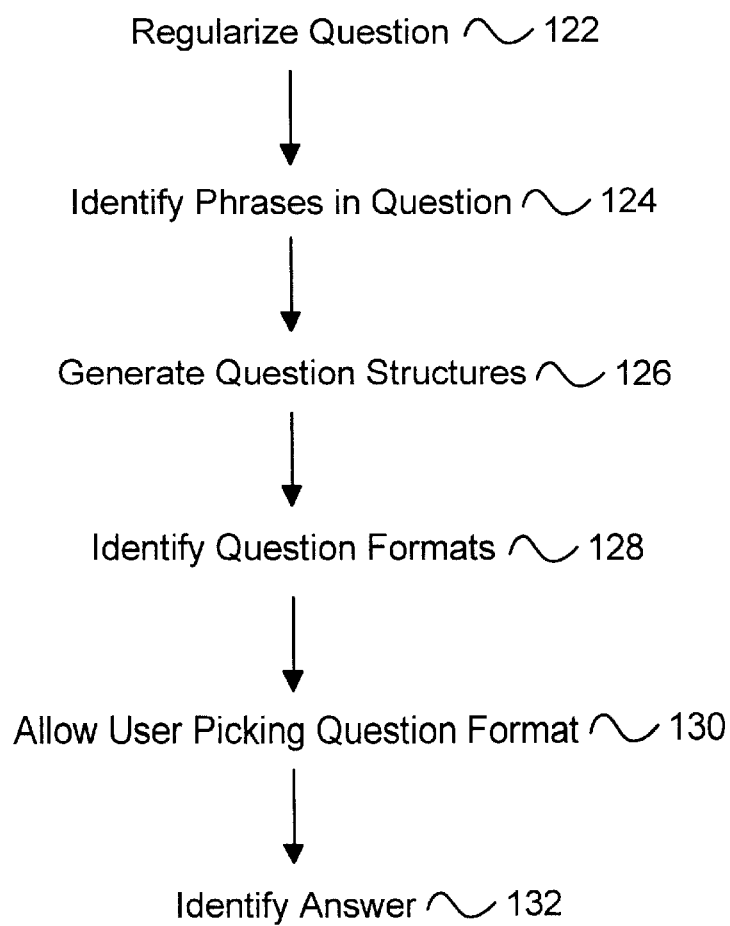
FIG. 3 shows one set of steps implemented by one embodiment of an answer generator of the invention.

FIG. 1 shows one embodiment of a system 50 of the present invention. It includes an input device 52 coupled to an answer generator 54, which is coupled to an output device 56. FIG. 2 shows one embodiment of the answer generator 54 implementing a set 120 of steps shown in FIG. 3.

A user enters a question into the input device 52, such as a keyboard, a mouse or a voice recognition system. The question or a representation of the question can be transmitted by the input device to the answer generator 54.

In one embodiment, the answer generator 54 includes a number of elements. The answer generator 54 can include a question regularizer 80, a phrase identifier 82, a question structure identifier 84, a question format identifier 86 and an answer identifier 88. In general terms, the question regularizer 80 regularizes (step 122) words in the question, such as by replacing words with their roots; the phrase identifier 82 identifies (step 124) phrases in the regularized question to generate phrased questions; the question structure identifier 84 generates (step 126) question structures from the phrased question; based on the question structures, the question format identifier 86 identifies (step 128) and retrieves one or more question formats, which the user is allowed to pick from; and then the answer identifier 88 identifies (step 132) and retrieves one or more answers for the question. Note that the answer identifier 88 can access the Internet or the Web for answers.

The generator 54 can also include a database 90 of relevant information to be accessed by different elements of the generator 54. The database 90, can be a relational database, an object database or other forms of database.

After the answer is generated, the output device 56, such as a monitor, a printer or a voice synthesizer, can present the answer to the user.

Figure 4A:
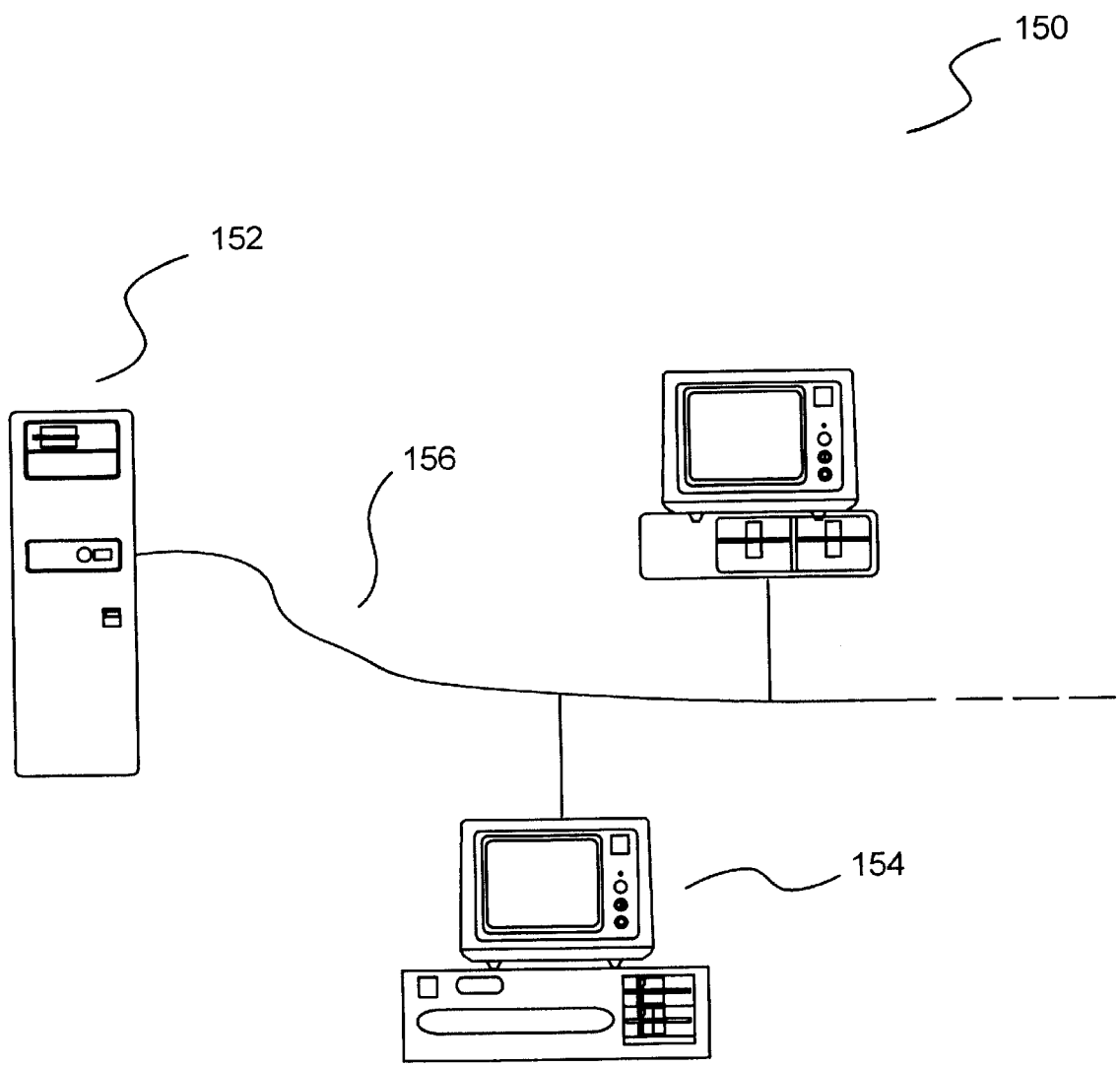
FIGS. 4A–B show embodiments implementing the invention.

FIG. 4A shows one physical embodiment 150 implementing one embodiment of the invention, preferably in software and hardware. The embodiment 150 includes a server computer 152 and a number of client computers, such as 154, which can be a personal computer. Each client computer communicates to the server computer 152 through a dedicated communication link, or a computer network 156. In one embodiment, the link can be the Internet, intranet or other types of private-public networks.

Figure 4B:
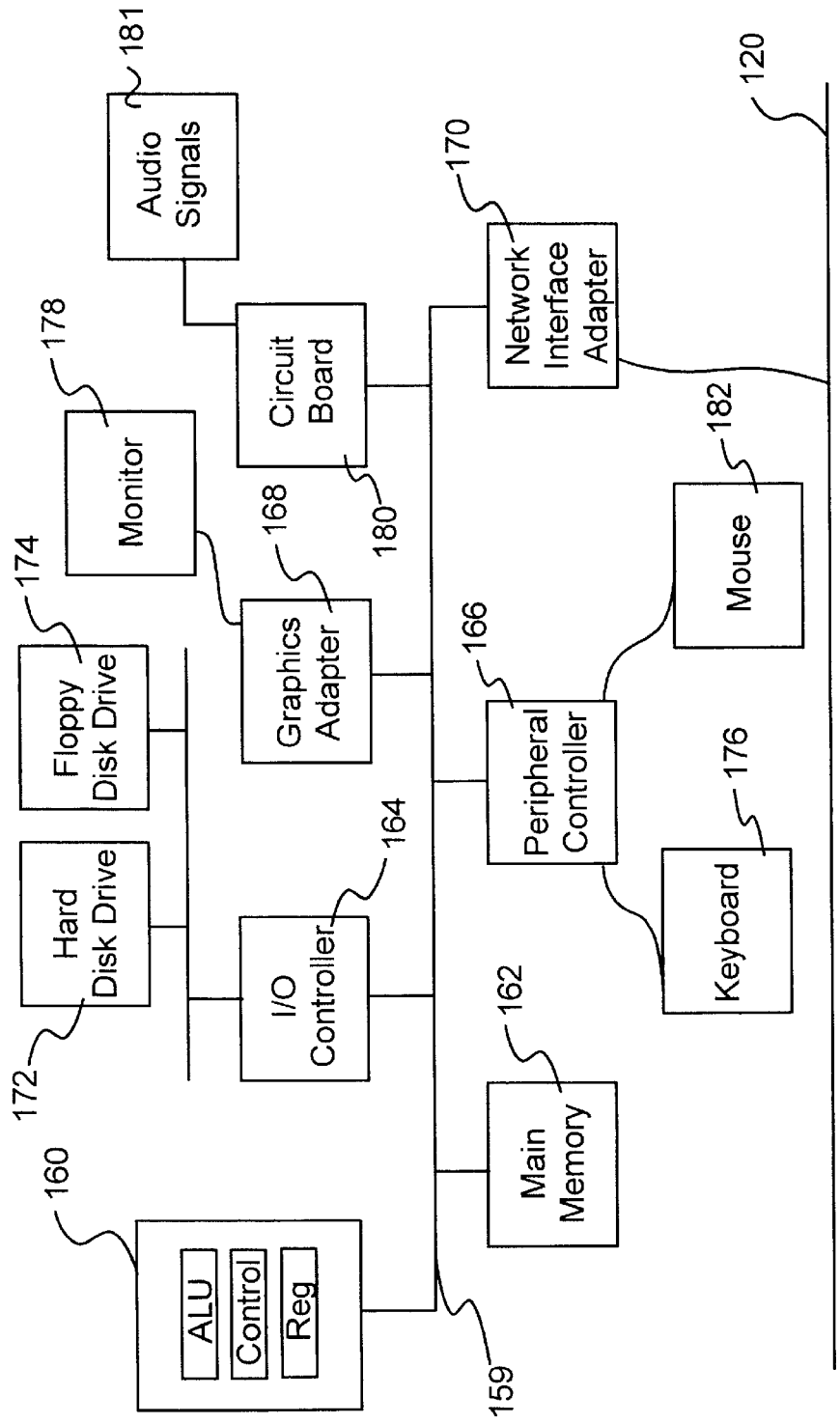

FIG. 4B shows one embodiment of a client computer 154. It typically includes a bus 159 connecting a number of components, such as a processing unit 160, a main memory 162, an I/O controller 164, a peripheral controller 166, a graphics adapter 168, a circuit board 180 and a network interface adapter 170. The I/O controller 164 is connected to components, such as a harddisk drive 172 and a floppy disk drive 174. The peripheral controller 166 can be connected to one or more peripheral components, such as a keyboard 176 and a mouse 182. The graphics adapter 168 can be connected to a monitor 178. The circuit board 180 can be coupled to audio signals 181; and the network interface adapter 170 can be connected to a network 120, which can be the Internet, an intranet, the Web or other forms of networks. The processing unit 160 can be an application specific chip.

Different elements in the system 50 may be in different physical components. For example, the input device 52 and the output device 56 may be in a client computer; and the answer generator 54 may reside in a server computer. In another embodiment, the input device 52, the output device 56, the answer generator 54 other than the database 90 are in a client computer; and the database 90 is in a server computer. In another situation, the database 90 can reside in a storage medium in a client computer, or with part of it in the client computer and another part in the server computer. In a fourth embodiment, the system 50 is in a client computer. Yet in another embodiment, the input device 52 and the output device 56 are in a client computer; the answer generator 54 other than the database 90 is in a middleware apparatus, such as a Web server; and the database 90 with its management system are in a back-end server, which can be a database server. Note that different elements of the answer generator 54 can also reside in different components.

In this invention, the question can be on a subject, which can be broad or narrow. In one embodiment, the subject can cover mathematics or history, or it can cover the JAVA programming language. In another embodiment, the subject covers information in a car, such as a Toyota Camry, and the user wants to understand this merchandise before buying it. In yet another embodiment, the subject covers the real estate market in a certain geographical area, and again the user wants to understand the market before buying a house.

In one embodiment, a question can be defined as an inquiry demanding an answer; and an answer can be defined as a statement satisfying the inquiry.

The question can be a natural-language question, which is a question used in our everyday language. A natural-language question can be in English or other languages, such as French. Examples of natural-language questions are:

Who is the President?

Like cream of mushroom soup?

A statement that is not based on a natural language can be a statement that is not commonly used in our everyday language. Examples are:

For Key in Key-Of(Table) do

Do while x>2

In one embodiment, one grammatical rule is that a question is made of phrases; another grammatical rule is that every phrase is made of one or more words. Such rules can define a grammatical structure. A question formed under such rules is grammatically context-free, and the question is in a context-free grammatical structure.

Figure 5:
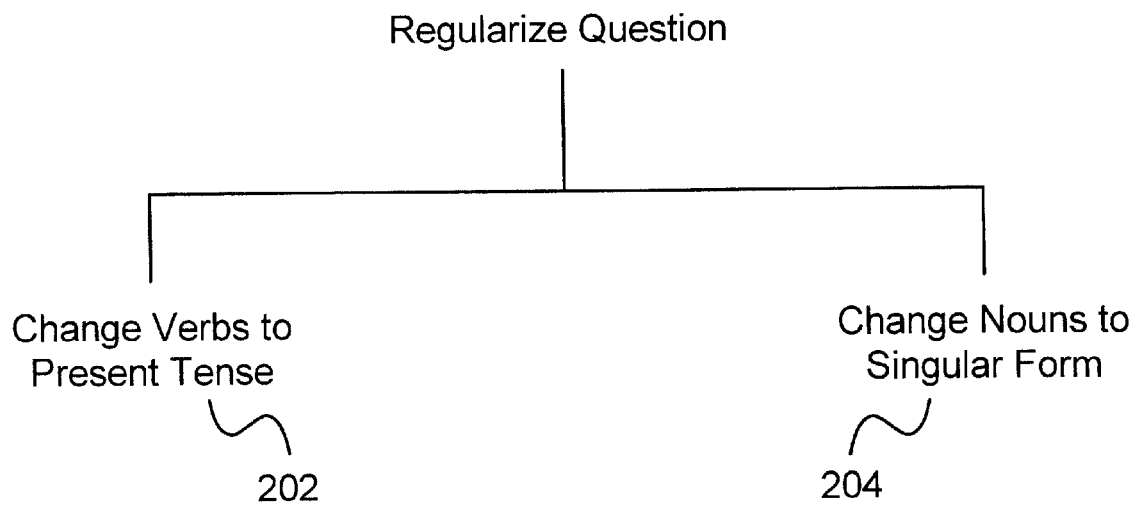
FIG. 5 shows examples of ways to regularize the question in the invention.

FIG. 5 shows examples of ways to regularize the question. The question regularizer 80 regularizes words in the question, for example, by replacing certain words in the question with their roots. One objective of the regularizer is to reduce the size of the database 90 and the amount of computation required to analyze the question.

In one embodiment, the regularizer 80 identifies every word in the question. Then it replaces words with their roots if they are not already in their root forms. For example, the regularizer changes verbs (step 202) of different forms in the question into their present tense, and nouns (step 204) into singular.

One approach to implement the replacement process is based on a hashing function. Every word in the question can be hashed into a hash value. In one embodiment, each character is represented by eight bits, such as by its corresponding eight-bit ASCII codes. The hashing function is performed by first pairing characters together in every word of the question. If a word has an odd number of characters, then the last character of the word is paired with zero. Each paired characters becomes a sixteen-bit number. Every word could have a number of sixteen-bit numbers. The character does not have to be represented by the eight-bit ASCII codes. In another embodiment, with each character represented by its sixteen-bit unicode, the characters are not paired. Again every word could have a number of sixteen-bit numbers.

For a word, add all of its sixteen-bit numbers, and represent the sum by a thirty-two bit number. For the thirty-two bit number, add the first two bytes and throw away the carry to generate a twenty-four bit number. This number is the hash value of the word. In one embodiment, each hash value can be used to represent two different words. One word can be in one language and the other in another language, with both languages represented by unicodes. A 16 Mbit memory could be used to hold different combinations of twenty-four bit hash values to represent different words. This approach should be applicable to most natural languages.

In one embodiment, commonly-used words have been previously hashed and stored in the database 90. There are also tables generated that link the hash values of those words with the hash values of their root forms. Then, the hash values of words in the question are compared to hash values in the tables and may be replaced by root-forms hash values. For example, the hash values of verbs of different forms in the question are mapped to and replaced by the hash values of their present tenses, and similarly, the hash values of plural nouns are mapped to and replaced by their corresponding singular form hash values.

Figure 6:
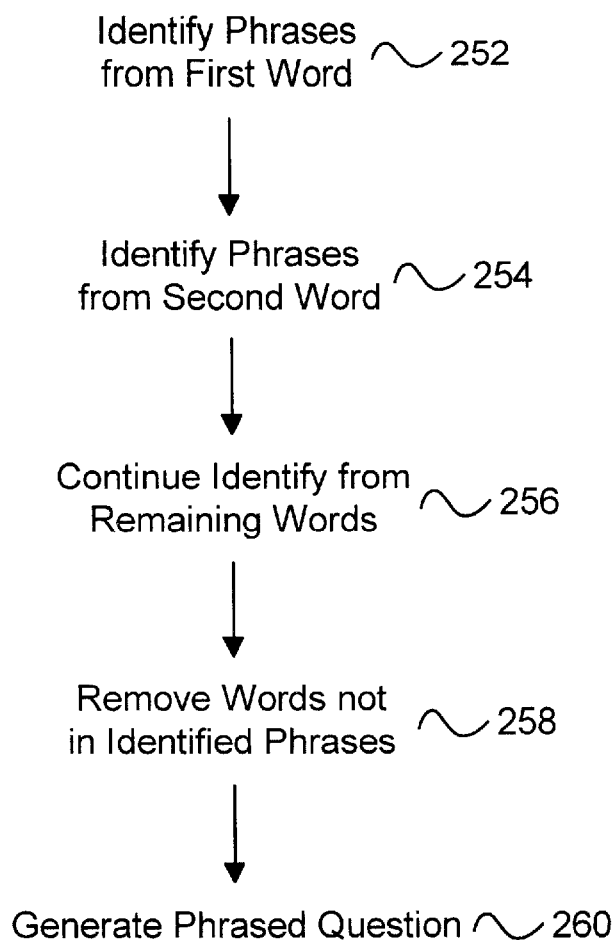
FIG. 6 shows one set of steps related to identifying phrases in the question of the invention.

In one embodiment, after some of the words in the question have been regularized, the phrase identifier 82 can identify phrases in the question. FIG. 6 shows one set 124 of steps related to identifying phrases. Note that the process of identifying does not have to include the process of understanding, determining its presence in the database, or extracting.

In one embodiment, the identifier identifies phrases from the beginning or the first word (step 252) of the question. It identifies the first word in the question, and then determines if the first word is in the database 90. If it is, it will be classified as a phrase of the question. Then, the identifier identifies the first two words. If there is a corresponding term with such two words in the database 90, then the two words are classified as another phrase of the question.

The phrase determination process can again be done through a hashing function. One approach is to add the hash values of each of the words in a phrase. If the sum has more than 24 bits, throw away the carry. The remaining 24 bits would be the hash value of the phrase. For example, the two words in the question can be hashed into a hash value, which is compared to hash values in the database 90. If such a hash value exists in the database 90, then the two words are classified as a phrase. In one embodiment, this process continues on up to the first twenty words in the question.

In one embodiment, when a hash value for a certain number of words does not exist, the identifier stops adding another word to identify phrases in the question. However, a hash value that exists in the database 90 does not mean that its corresponding word or words can have independent meaning. The existence of a hash value in the database 90 can imply that the phrase identifier 82 should continue on adding words to look for phrases. For example, the identifier 82 should continue on adding words to identify the longest matching phrase, which can be a phrase with six words. For example, the term, "with respect", may not be a phrase, or does not have independent meaning. But the hash value of such a term can be in the database 90. Then the identifier adds the next word in the question to determine if the three-word combination exists in the database 90. If the third word is the word "to", then the three-word combination is a preposition with independent meaning, and can have a hash value in the database 90.

After identifying all of the phrases from the first word, the identifier starts from identifying (step 254) phrases from the second word of the question, and performs similar identification process as it has done from the first word. One difference is that the starting point of the analysis is the second word.

As an example, the question is, "Are ball bearings round?" The identifier starts from the word, "are", and stops after the word, "balls", because there is no hash value for the term, "are ball". Then, the identifier starts from the word, "ball", and finds a hash value. This suggests that the identifier should continue on, and found the hash value for the term, "ball bearings".

The identifier can continue on identifying phrases from the remaining words (step 256) in the question. The starting point of the analysis moves from one word to the next, down the question, until all of the words in the sentence have been exhausted.

At the end of phrase identification, the identifier should have identified all of the phrases in the question with corresponding phrases in the database 90. In one embodiment, the identifier then removes (step 258) words in the question that are not in any identified phrases. For example, there is a word, "xyz", in the sentence, which is not found in any of the identified phrases. That word will not be considered in subsequent analysis, or will be ignored. In essence, that word is removed from the question.

From the identified phrases, the phrase identifier 82 generates (step 260) a number of phrased questions. Each phrased question is a combination of one or more identified phrases that match the question. All of the phrased questions cover different combinations of the identified phrases that match the question.

For example, the question is "Cash cow?"
There can be two phrased questions, and they are:
1. "Cash" "cow"?
2. "Cash cow"?

The first phrased question has two phrases, each with one word. The second phrased question has only one phrase, with two words.

Many languages, such as English, favor the use of multiple words that give a different meaning if combined together. Depending on how words are phrased together, the phrased questions can have very different meanings. As in the above example, the meaning of "cash cow" is different from the meaning of, "cash" and "cow", individually.

Based on the one or more phrased questions, the question structure identifier 84 identifies one or more question structures. FIG. 7 shows one set 126 of steps related to identifying question structures.

In one embodiment, phrases in the database 90 are categorized (step 302). A phrase can belong to one or more categories. A category can be a group of phrases, with one or more common characteristics, which can be related to a subject matter. For example, there are two categories and they are Congress and finance. Then, one semantic rule can be that the phrase "bill" belongs to both categories, while another semantic rule can be that the phrase "Capital Asset Pricing Model" belongs to the category of finance.

For each phrased question, each of its phrases can be linked (step 302) by a linker to one or more categories. For example, for the phrased question, "cash" "cow", the phrase "cash" can be linked to the categories of finance, banking and payment; and the phrase "cow" can be linked to the categories of animals and diary products. For the phrased question, "cash cow", the phrase "cash cow" can be linked to the categories of finance and banking.

Each category can be given a score. In one embodiment, the score denotes the importance of the category, or the relevancy of the category to the question. The score can depend on the meaning of the category. For example, the category of Congress is given 10 points, and the category of finance is given 30 terms because more people ask about finance than Congress. The scores can depend on the subject the user is asking. For example, if the question is about travel, the category on city can be given 20 points, and the category on animal 5 points. Scoring categories can be done dynamically. For example, after the question has been determined to be in the area of finance, the category on insect can be dynamically given 0.1 point or even 0 points, while the category on investment can be given 100 points. In this example, one semantic rule can be that in the finance area, the score of the category of investment is higher than that of the category of insect.

In another example, the scores given to interrogative pronouns can depend on the type of questions asked. In the travel domain or in questions on traveling, the categories for "how", "where", "what" and "when" can be given higher scores than the category for "who".

Each phrase in a phrased question can belong to more than one categories. With the categories having scores, each phrase belonging to multiple categories can have more than one scores. In one embodiment, the category with the highest score is selected to be the category of that phrase, or to be the score of that categorized phrase (step 304).

Figure 8:
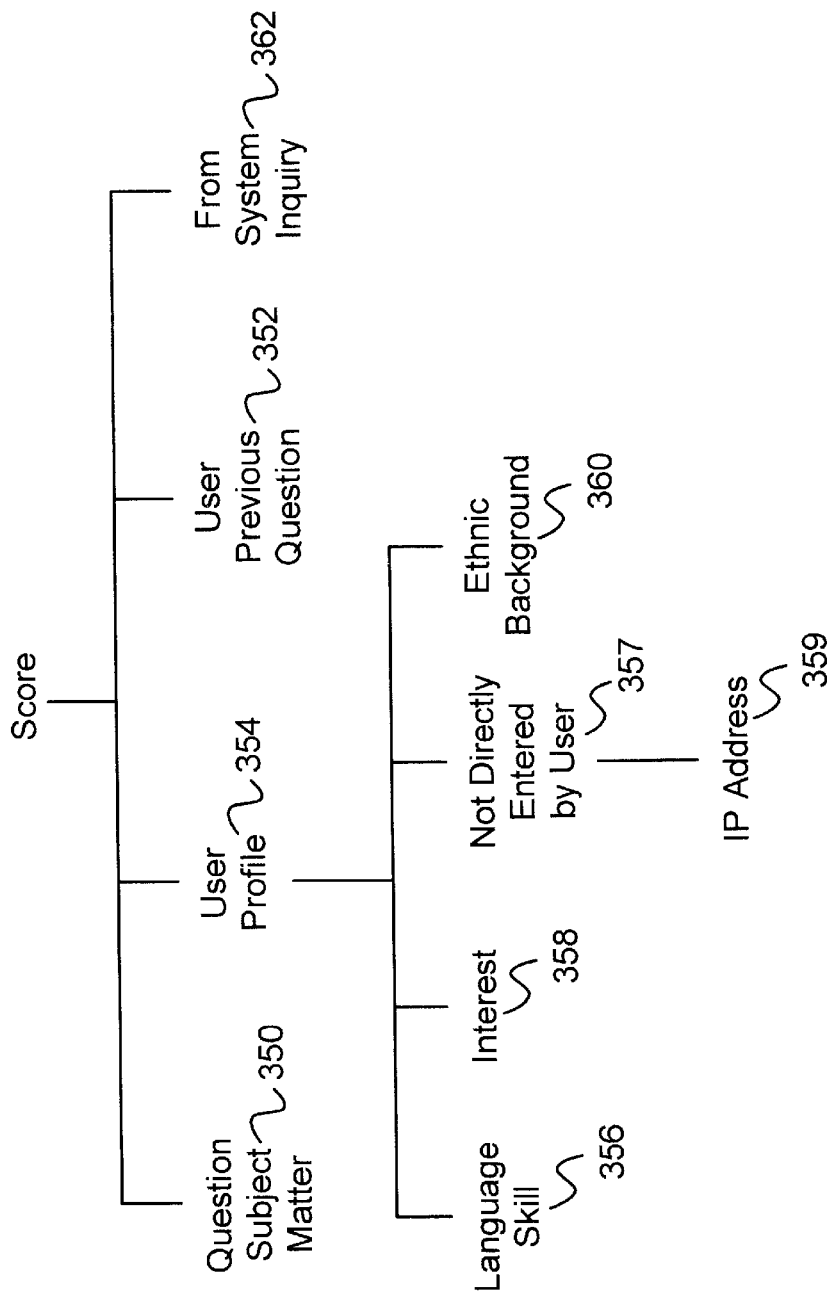
FIG. 8 shows examples of factors affecting scores in the invention.

In one embodiment, the score of at least one phrase depends on information about the user. This information can be specific to that user. FIG. 8 shows examples of factors affecting the scores. In one embodiment, the information about the user is more than the fact that the user just asked the system 50 a question.

The information can be related to the question's subject matter 350, identified by the user. For example, the system 50 can ask the user the subject of his question. In another approach, before the user asks a question, the user has to select one subject of interest. All of his question would be considered to be related to that subject.

The information can be related to the user's previous question 352. For example, the user has been asking questions related to health, and his question has the word, virus, in it. The system 50 would not consider the question to be related to computer virus, but would focus on the type of virus affecting our health.

In one embodiment on previous questions, the input and output devices are in a client computer used by the user to ask questions, and the answer generator is in a server computer. At the request of the server computer, the Web browser in the client computer stores the question asked by the user in cookies. The next time when the user accesses the server computer to ask another question, the cookies are sent back to the server computer. The responses generated by the server computer depend on information in the cookies, such as the one or more questions previously asked by the user.

In another embodiment, previous questions can be stored in, for example, HTML forms, which support hidden variables, or HTML scripts written in JavaScript, which supports variables. For the HTML forms example, the question format identifier can generate a set of instructions to represent question formats to be sent to the user. The instructions can be written in HTML form. During a question/answer interactive session between the user and the system, the input device remembers the one or more question asked by the user and the question formats selected by the user. After a user has selected a question format or asked a new question, the input device can send it to the answer generator. The format sent can also include one or more previous questions asked by the user during the same session. Those questions are stored in the hidden variables of the question format. In this example, during the interactive session, all of the user's inputs can be stored. Whenever anything is sent to the answer generator, all of the user's previous inputs can be sent to the generator in the hidden variables.

The information can be related to a profile of the user 354. For example, the user is asked to fill in a questionnaire about himself before he starts asking question. His profile can include his language skill, 356, such as the languages he prefers his answer to be in; his areas of interest, 358, such as the types of songs he likes; and his ethnic background, 360. For example, the user is an Egyptian. Then, categories related to Egypt can be given higher scores. Such information would help the system 50 tailor more accurate and relevant responses to him. In one embodiment, a user enters his identifier when he starts to use the system. Then, next time when he uses the system 50, based on his identification, the system 50 can retrieve his profile. His profile can be updated based on his usage of the system 50, for example, based on questions he just asked. Again, his identification can be stored in cookies.

In yet another embodiment, certain information 357 in the user's profile does not have to be directly entered by the user. As an example, the invention can be implemented in a client-server environment, with the client having an IP address. At least a portion of the answer generator resides in a server, and at least a portion of the input device in a client. Certain information in the user's profile may depend on the IP address 359. After the client has established, for example, a HTTP session with the server, the client's IP address would be passed to the server. Based on the source IP address, the server can go to a domain name database, such as those hosted by Network Solution Incorporated, to access the domain name of the client. The domain name gives a number of information, such as the point of presence of the Internet service provider used by the client. The server would then be aware, for example, the approximate ZIP code of the client, or the approximate geographical location of the client. As an example, such information can be used in the following way. If the user is approximately located in San Francisco, and he is asking for hotel information in Boston, the server can assume that the user intends to travel to Boston. Based on such an assumption, the server can send to the client answers related to car rental information and flight ticket information when responding to his question for hotel information.

Based on the user's question, the system 50 can ask the user to refine the question. For example, the question includes the word "current". The system 50 can ask the user if his question is related to the subject of electricity or time or other physical phenomena. Based on the system's inquiry 362, information related to the user's question can be acquired to improve on the responses to the question. In this embodiment, there can be multiple interactive sessions between the user and the system 50. The system can ask the user more than one question so as to refine the answer. For example, after the user has responded that the word "current" is related to other physical phenomena, the system 50 can ask the user if the question is related to wind or ocean or other physical phenomena so as to better understand the question.

In one embodiment, the score of at least one phrase depends on the subject matter of the question. Information on the subject matter of the question, or the domain knowledge, does not have to be from the user. For example, the system 50 can be tailored for a specific subject, such as information related to a specific company, including that company's products. That system can be designed to answer questions related to the company, with many phrases, question formats and answer formats focused on the company. For example, the company is a hardware company, and the user asks the question, "Do you have nails?" The system 50 would not interpret the question to refer to nails as in finger nails. The system 50 assumes the question to be related to nails, as in screws and nails, and responds accordingly. In another embodiment, the system is tailored to more than one subject matter, and can be switched from one subject matter to another using the same database. The switch can be done, for example, by adjusting the scores of different categories based on their relevancy to the subject matter.

In one embodiment, based on information related to the user and/or the subject matter of the question, scores on categories and, in turn, phrases can be changed. The change can be dynamic. In other words, scores are modified as the system gains more information. This can be done, for example, by applying multipliers to scores of categories to be changed. In another embodiment, after phrases have been categorized and before the scores of the categorized phrases are determined, those scores are changed according to the information related to the user and/or the subject matter of the question. In yet another embodiment, due to changes in the scores of the categories, a phrase previously linked to a category is modified to be linked to another category.

In one embodiment, after categorizing and scoring each phrase in a phrased question, the structure identifier generates (step 306) a number of question structures. Each phrase in the question can be linked to a category, and each phrased question can be represented by the corresponding categories. In one embodiment, the categorized representation of each phrase question can be known as a question structure, or a question structure can be a list of categories. For example, the question structure of the phrase question, "cash" "cow" can be "finance" "animals", and the question structure of the phrase question "cash cow" can be "finance". In this example, the question, "Cash cow?" is linked to two question structures.

In another embodiment, the number of question structures generated can be reduced, which could increase the speed to generate a response, and could also reduce ambiguity in the question. The method is by reducing the number of categories. One way is to form categories of categories, or a hierarchy of categories. Each category can be given a name. With each question structure being a list of categories, each question structure can be represented by a list of category names. In one embodiment, the phrase identifier 82 can operate on the list of category names to determine category-of-categories.

The category-of-category approach can be explained by the following example. The original question includes the phrase, "San Jose of California". "San Jose" is under the category of city, "of" is under the category of "preposition", and "California" is under the category of State. One semantic rule may be that there is a "City of State" category to replace the list of categories "city" "preposition" "State".

This type of category-of-categories analysis can be extended into a category hierarchy. The "city", "preposition" and "State" can be considered as first level categories, while the "city of State" category can be considered as a second level category. The method to identify higher level categories can be the same as the method to identify second level categories based on first level categories, as long as each category is given a name. For example, a third level category can replace a list of second level categories.

At the end of the category-of-categories analysis, different level categories can be classified simply as categories. This approach can reduce the number of categories. With fewer categories, some question structures might be identical. Thus, this approach may reduce the number of question structures also.

In one embodiment, one semantic rule is that a higher level category is assigned a higher score than its lower level categories. For example, the "city of State" category has a higher score than the "city", "preposition" and "State" categories.

The question structure identifier 84 can select a number of the generated question structures. In one embodiment, the structure identifier provides (step 308) a score to each question structure by summing the scores of all of its categories. The question structure identifier 84 then selects (step 310), for example, the question structure with the highest score to be the question structures representing the question. In one example, the identifier selects the structures with the top five highest scores to be the structures representing the question.

Figure 9:
FIG. 9 shows one set of steps related to identifying question formats in the invention.
Figure 9:

In one embodiment, after the question structures representing the question have been selected, the question format identifier 86 identifies one or more question formats in the database 90. FIG. 9 shows one set of steps related to identifying question formats.

Each question format can be a pre-defined question with one or more phrases and one or more categories. The following can be a question format:

What is "a financial term"?

The question, "What is preferred stock?", falls under the above question format.

Each category in a question format has a number of corresponding phrases. For example, the corresponding phrases of the category "major city" can include all of the cities in the United States with population exceeding one million people.

The question formats can be pre-defined and stored in the database 90. One way to generate them can be based on commonly-asked questions. For example, if more than twenty people ask the same or substantially similar question when they use the system 50, a system administrator can generate a question format for that question structure. To illustrate, more than twenty people asked the following questions, or a variation of the following questions:

A list of restaurants in San Francisco?

Restaurants in San Francisco?

Where can I find some good restaurants in San Francisco?

All of these questions have a set of similar key words, which are restaurant and San Francisco. The system 50, after cataloging twenty occurrences of such questions, provides one of the twenty questions to the system administrator, who can then generate the following question format:

Would you recommend some good restaurants in "major city"?

There are a number of ways to identify question formats. A question structure can have one or more categories. In one embodiment, for a question structure, the question format identifier identifies every question format that has all of the categories in that question structure (step 402). There can be situations when a question structure has a number of categories, and no question format in the database 90 has all of the categories. In one embodiment, for a question structure, the question format identifier identifies question formats that have at least one category in the question structure.

Based on the question structures, there can be a number of question formats identified. Then, the question format identifier 86 can select (step 404) one or more of them. One selection criterion is based on scores of the question formats. Each question format includes one or more categories, and each category has a score. The sum of all of the scores of the categories in a question format gives the question format a score. In one embodiment, the question format with the highest score is selected. In another embodiment, the five question formats with the highest scores are selected.

A category in a question format can have a default value. Each category typically has many phrases. In one embodiment, one of the phrases is selected to be the default phrase (step 406) of the category in the question format. That phrase can be the corresponding phrase in the original question leading to the selection of the category and the question format. For example, the question is, "What is the temperature in San Francisco?" The question format selected is, "What is the temperature in 'city'?" Instead of the generic term "city", the question format becomes, "What is the temperature in 'San Francisco'?" In other words, San Francisco has been chosen to be the default city.

In one embodiment, the system 50 allows (step 130) the user to pick one or more of the selected question formats. This can be done by the question format identifier generating a number of instructions representing the selected question formats, and sending the instructions to the output device 56. In one example, the browser in the output device 56, based on the instructions, displays the selected question formats to allow the user to pick.

The output device 56 can show the user all of the selected question formats. Next to each of the selected question formats there can be an enter icon. If the user clicks the enter icon, that question format would be picked as the selected one.

The user can also choose any one of the phrases within each category of a question format. For example, the question format picked is, "What is the temperature in 'San Francisco'?" And the user decides to find out the temperature in Los Angeles. In one embodiment, the user can click the phrase "San Francisco", then a list of cities shows up on the output device 56. The user can scroll down the list to pick Los Angeles. Then, by clicking the enter icon next to the question, the user would have selected the question format, "What is the temperature in 'Los Angeles'?"

Figure 10:
FIG. 10 shows one set of steps related to identifying answer in the invention.

After one or more question formats have been picked by the user, the answer identifier 88 identifies one or more answers for the user. FIG. 10 shows one set 132 of steps related to identifying answer.

In one embodiment, each question format has its corresponding answer format. The answer identifier 88 retrieves (step 452) one or more answer formats for each question format. The answer format can be an answer or can be an address of an answer. In situations where the answer format is an address of an answer, the answer identifier can also access (step 454) the answer based on the answer format.

As an example, the answer format of a question format is the URL of a Web page. If the user picks that question format, the answer identifier 88 would retrieve the corresponding answer format, and fetch the one or more Web pages with the retrieved URL.

In another embodiment, based on each of the answer formats, a set of instructions are generated to search for information, for example, from different databases or other sources, such as the Web. The instructions can be queries written, for example, in SQL, or HTTP.

In another embodiment, as the output device shows a list of selected question formats for the user to pick, the output device 56 also shows the answer to the question format with the highest score.

There are different ways to implement the present invention. In one embodiment, the phrase identifier 82 can identify a few phrases, and then the question structure identifier 84 can generate a few question structures. As long as there are, for example, ten question structures with scores more than a threshold value, the system 50 would stop looking for additional question structures. If there are only nine such structures, the phrase identifier 82 would identify some more phrases, and the structure identifier 84 would generate more question structures. In other words, the system 50 does not have to look for all phrases in the question before question structures are identified. The threshold value can be set by experience. For example, from past usage, maximum scores of question structures in certain subject areas, such as the traveling domain, are typically less than eighty. Then, for those types of questions, the question structure identifier 84 could set the threshold value to be seventy five. This approach would speed up the time required to respond to the question.

Another way to speed up the response time is through focusing on a set of question formats in the database. The question formats can be grouped together based on common characteristics. For example, all formats related to San Francisco are grouped together. Then based on information about the subject matter and/or the user, such as the user is asking questions about San Francisco, those formats would be selected to have one or more of them identified by the question format identifier 86. In another embodiment, if the question is related to San Francisco, the scores of formats related to San Francisco would be multiplied by a factor of, for example, five. This could increase the chance of finding more relevant question formats for the user, and, in turn, more relevant answer to the question.

Note that the answer does not have to be presented by the output device 56 in the same language as the question. The database can include information of different languages. For example, the user can ask the question in English. The subsequent analysis can be in English, with, for example, the question formats also in English. Then, each selected question format is transformed into instructions, with phrases or categories in the format translated into their equivalent terms in other languages. At least one of those categories can be selected in view of a phrase in the question. The translation can be done, for example, through unicodes. As an illustration, the English name of a person is translated into that person's name as known in his native language. After the transformation, the instructions can be used to search for or retrieve one or more answers to the question.

A different embodiment is that the system administrator can previously define certain answer formats to be in French, or to be the URL of a French Web site for the answer. French information would be retrieved to be the answers.

In yet another embodiment to have answers in a language different from the question, the regularizer 80 serves the function of a translator by translating the question into the other language. From that point onwards, the analysis will be in the other language. For example, the question is translated into German. Subsequently, phrases, structures, formats and answers would all be in German.

One embodiment includes a computer readable media containing computer program code. The code when executed by a computer causes the computer to perform at least some of the steps of the present invention, such as some of those defined in FIG. 3. In another embodiment, a signal is sent to a computer causing the computer to perform at least some of the steps of the present invention, such as some of those defined in FIG. 3. This signal can include the question, or a representation of the question, asked by the user. The computer can include or can gain access to the database 90.

Note that different embodiments of the present invention can be implemented in software or in hardware. For example, steps shown in FIG. 3 or the answer generator shown in FIG. 2, can be implemented in hardware or in software or in firmware. The implementation process should be obvious to those skilled in the art.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method for answering a natural-language question from a user by a first computing engine having access to a database with a plurality of phrases, the method comprising:
   identifying at least one phrase in the natural-language question entered by the user, based on at least a phrase in the database and at least one grammatical rule; and
   generating a response to the question by the first computing engine based on at least one semantic rule and a piece of information related to an interest from the user profile of the user;
   wherein the question was entered into a second computing engine which is connected to the first computing engine through a network; and
   wherein the piece of information depends on at least an inquiry from the first computing engine.

2. A method as recited in claim 1 wherein the method further comprises providing a score to the identified phrase.

3. A method as recited in claim 2 wherein
   the database includes question formats;
   said identifying at least one phrase includes identifying at least two phrases in the question, based on phrases in the database and at least one grammatical rule;
   said providing a score includes providing a score to each of the identified phrases; and
   the method further comprises identifying at least two question formats in the database based on at least the scores to allow the user to select at least one of the question formats for answering the question.

4. A method as recited in claim 1 wherein said generating also depends on at least a category related to the identified phrase.

5. A method as recited in claim 4 wherein the category is changed to another category in view of another piece of information related to the user.

6. A method as recited in claim 1 wherein the response remains the same independent of a word in the question.

7. A method as recited in claim 1 wherein the database includes question formats; and the method further comprises identifying at least two question formats in the database based on the identified phrase; and allowing the user to select at least one of the question formats for answering the natural-language question.

8. A method as recited in claim 1 wherein said generating is also based on the subject matter of the question.

9. A method as recited in claim 1 wherein said generating includes identifying an address location in the Internet.

10. A method as recited in claim 1 wherein
    said response is in a language different from that of the question.

11. A method as recited in claim 1 wherein said generating is related to a piece of demographic information of the user.

12. A method as recited in claim 11 wherein the piece of demographic information is related to the ethnicity of the user.

13. A method as recited in claim 11 wherein the piece of demographic information is related to where the user is located.

14. A method as recited in claim 1 wherein said generating is related to a history of one or more questions previously asked by the user.

15. A method as recited in claim 14 wherein the history is stored in cookies.

16. A method as recited in claim 14 wherein the history is stored in hidden variables supported by hypertext markup language.

17. A method as recited in claim 1 wherein said generating depends on a piece of information about the user, but not entered by the user.

18. A method as recited in claim 17 wherein the piece of information not entered by the user depends on the Internet protocol address of the second computing engine.

19. A method as recited in claim 1 wherein
    the question includes a plurality of phrases;
    at least two of the phrases are related to two different categories; and
    the two different categories are classified under a higher-level category.

20. A method as recited in claim 1 wherein before said identifying at least one phrase in the question, the method further comprises regularizing at least one phrase in the question.

21. A method for answering a natural-language question from a user by a computing engine having access to a database with a plurality of phrases, the method comprising:

identifying at least one phrase in the natural-language question entered by the user, based on at least one phrase in the database and at least one grammatical rule; and generating a response to the question based on the identified phrase and at least one semantic rule, with the response being in a language different from that of the question.

22. A method for answering a natural-language question from a user by a second computing engine, the method comprising:

transmitting, through a network, the natural-language question entered by the user to a first computing engine having access to a database with a plurality of phrases, the first computing engine being configured to:

identify at least one phrase in the question, based on at least a phrase in the database and at least one grammatical rule; and generating a response to the question based on at least one semantic rule, and a piece of information related to an interest from the user profile of the user;

wherein the piece of information depends on at least an inquiry from the first computing engine.

23. An apparatus for answering a natural-language question from a user, the apparatus comprising:

a phrase identifier configured to identify at least one phrase in the natural-language question entered by the user, based on at least a phrase in a database and at least one grammatical rule;

a response generator configured to generate a response based on at least one semantic rule, and a piece of information related to an interest from the user profile of the user;

wherein the question was entered into a computing engine, which is connected to the apparatus through a network; and wherein the piece of information depends on at least an inquiry from the first computing engine.

24. A computer readable media containing computer program code that is useful for answering a natural language question from a user, said code when executed by a first computing engine, having access to a database with a plurality of phrases, causing the first computer to perform a method comprising:

identifying at least one phrase in the natural language question entered by the user, based on at least a phrase in the database and at least one grammatical rule; and generating a response to the question by the first computing engine based on at least one semantic rule, and a piece of information related to an interest from the user profile of the user;

wherein the question was entered into a second computing engine, which is connected to the first computing engine through a network; and wherein the piece of information depends on at least an inquiry from the first computing engine.

25. A method for answering a natural-language question from a user by a first computing engine having access to a database with a plurality of phrases, the method comprising:

identifying at least one phrase in the question entered by the user, based on at least a phrase in the database and at least one grammatical rule; and generating a response to the question by the first computing engine based on at least one semantic rule and a piece of demographic information of the user;

wherein the question was entered into a second computing engine, which is connected to the first computing engine through a network.

26. A method as recited in claim 25 wherein the response depends on an interest of the user, obtained at least from a user's response to an inquiry from the first computing engine.

27. A method as recited in claim 25 wherein responding to the question is related to a history of one or more questions previously asked by the user.

28. A method as recited in claim 25 wherein the response is in a language different from that of the question.

29. A method for answering a natural-language question from a user by a first computing engine having access to a database with a plurality of phrases, the method comprising:

identifying at least one phrase in the question entered by the user, based on at least a phrase in the database and at least one grammatical rule; and generating a response to the question by the first computing engine based on at least one semantic rule, a history of questions previously asked by the user and at least a piece of information related to the profile of the user;

wherein the question was entered into a second computing engine, which is connected to the first computing engine through a network.

30. A method as recited in claim 29 wherein responding to the question depends on a piece of information about the user, but not entered by the user.

31. A method as recited in claim 29 wherein the response is in a language different from that of the question.

32. A method as recited in claim 29 wherein the response depends on an interest of the user.

33. A method as recited in claim 29 wherein the interest of the user is at least from a user's response to an inquiry from the first computing engine.

34. A method as recited in claim 29 wherein said generating depends on a piece of information about the user, but not entered by the user.

* * * * *